United States Patent [19]

Douglas

[11] 3,769,893
[45] Nov. 6, 1973

[54] ELECTROMAGNETICALLY ACTUATED EXPOSURE CONTROL MECHANISM

[75] Inventor: Lawrence M. Douglas, South Easton, Mass.

[73] Assignee: Polaroid Corporation, Cambridge, Mass.

[22] Filed: Apr. 21, 1972

[21] Appl. No.: 245,801

[52] U.S. Cl. .................... 95/53 EB, 95/56, 95/62
[51] Int. Cl. ............................................. G03b 9/42
[58] Field of Search .................... 95/10 CE, 53 EB, 95/11 SR, 56, 59, 53 EA, 53 E, 62, 64 B

[56] References Cited
UNITED STATES PATENTS
3,661,066  5/1972  Ettischer ........................ 95/53 EB

*Primary Examiner*—J. D. Miller
*Assistant Examiner*—Harvey Fendelman
*Attorney*—Charles Mikulka et al.

[57] ABSTRACT

An exposure control mechanism of a variety having two blades driven from a reciprocally pivotable walking beam. The mechanism is actuated by selectively energizing and de-energizing a solenoid having a plunger retractable within an excitation winding upon energization of the latter. The plunger is biased outwardly by a compression type opening spring providing an abuttable contact between the plunger tip and walking beam. A closing spring attached to the walking beam serves to bias the blades of the mechanism to move in a closing direction. Because the opening spring has a higher force value characteristic than the closing spring, the mechanism normally defines an open shutter condition. When the solenoid is energized, the plunger moves to compress the opening spring and negate its abuttable contact with the walking beam to permit the shutter to be closed under the isolated drive of the closing spring.

26 Claims, 5 Drawing Figures

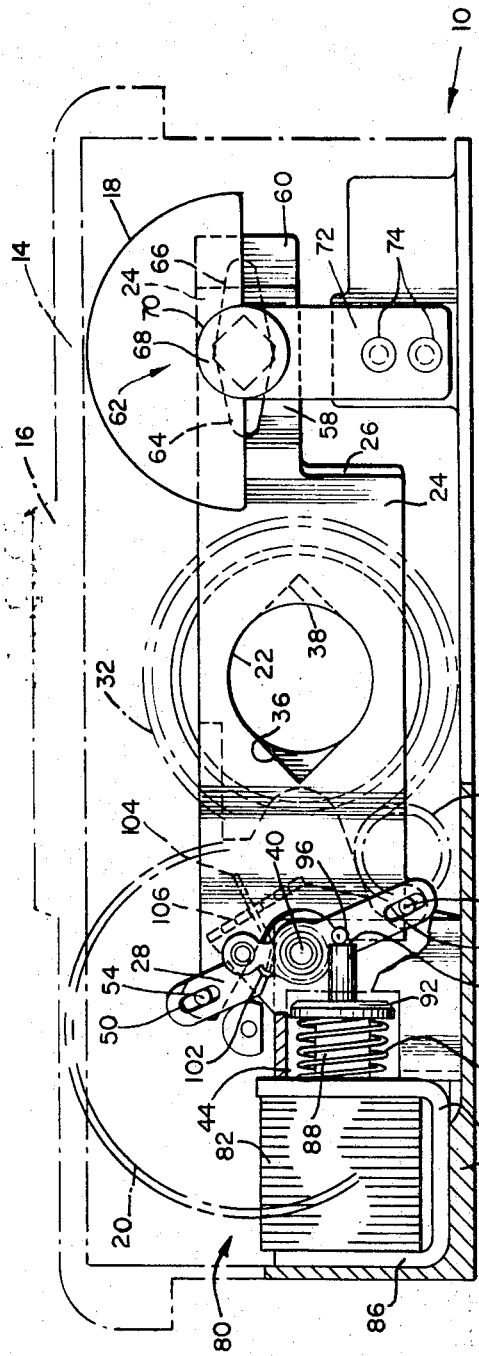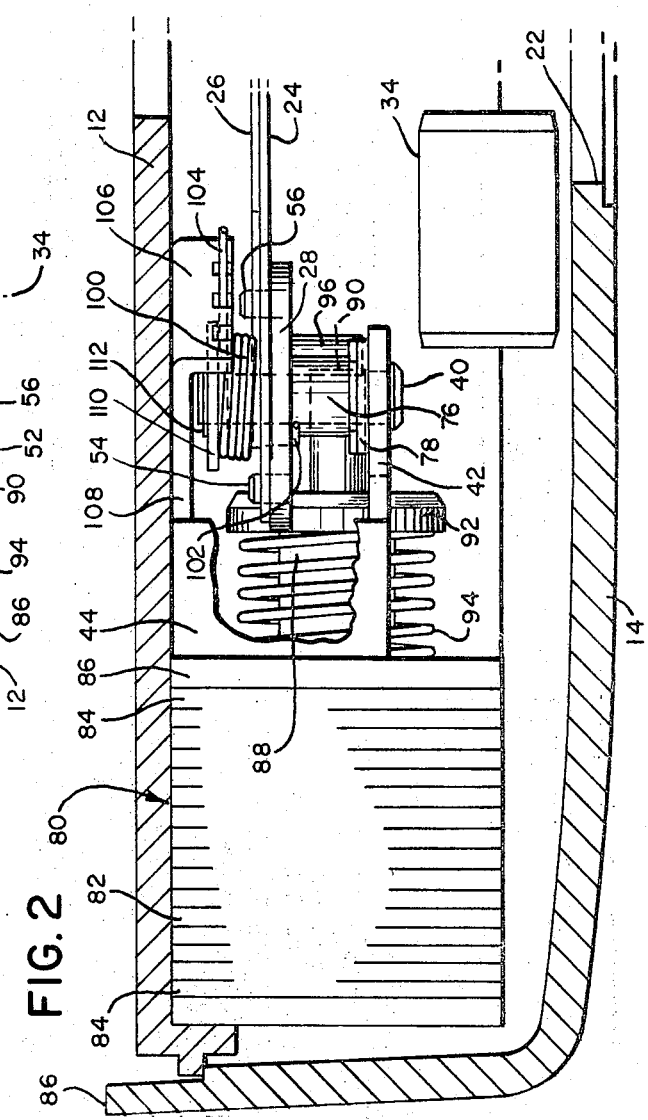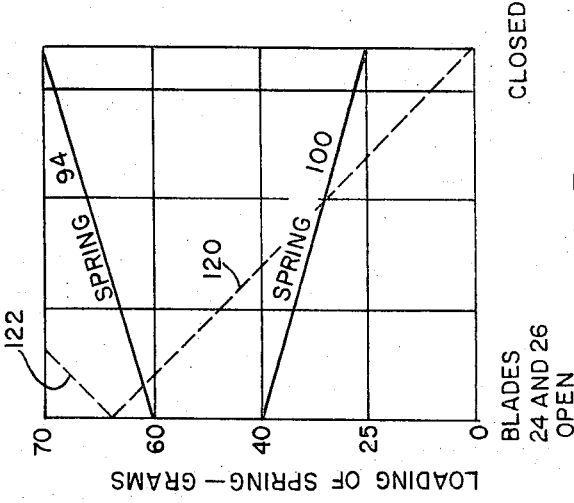

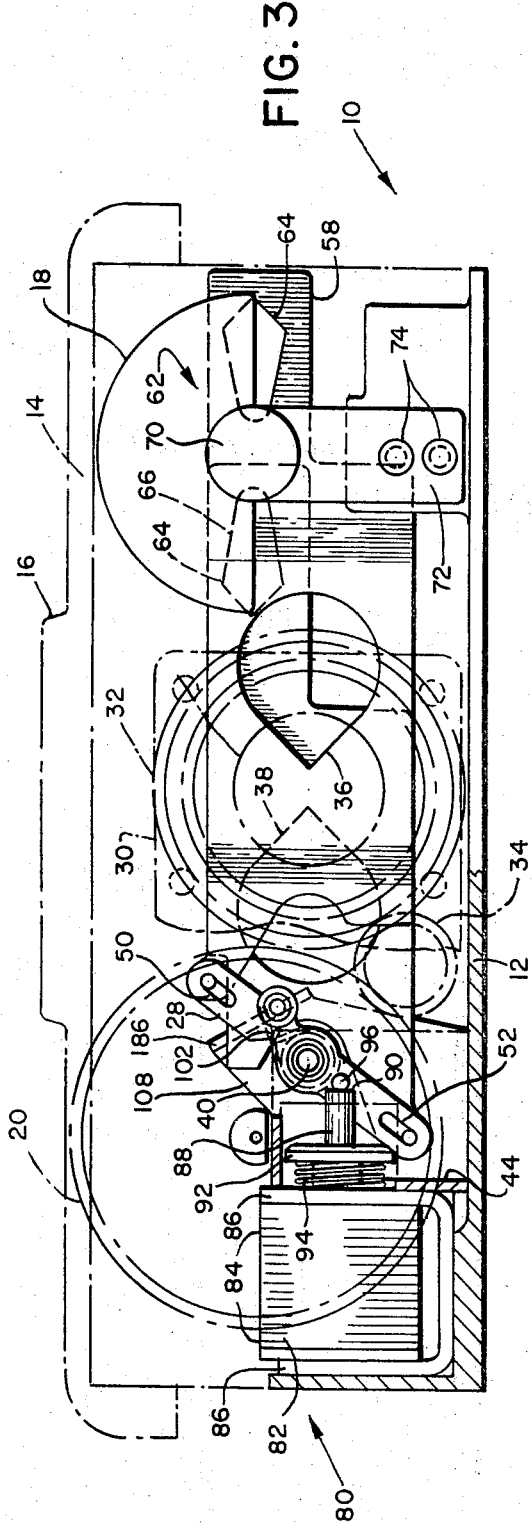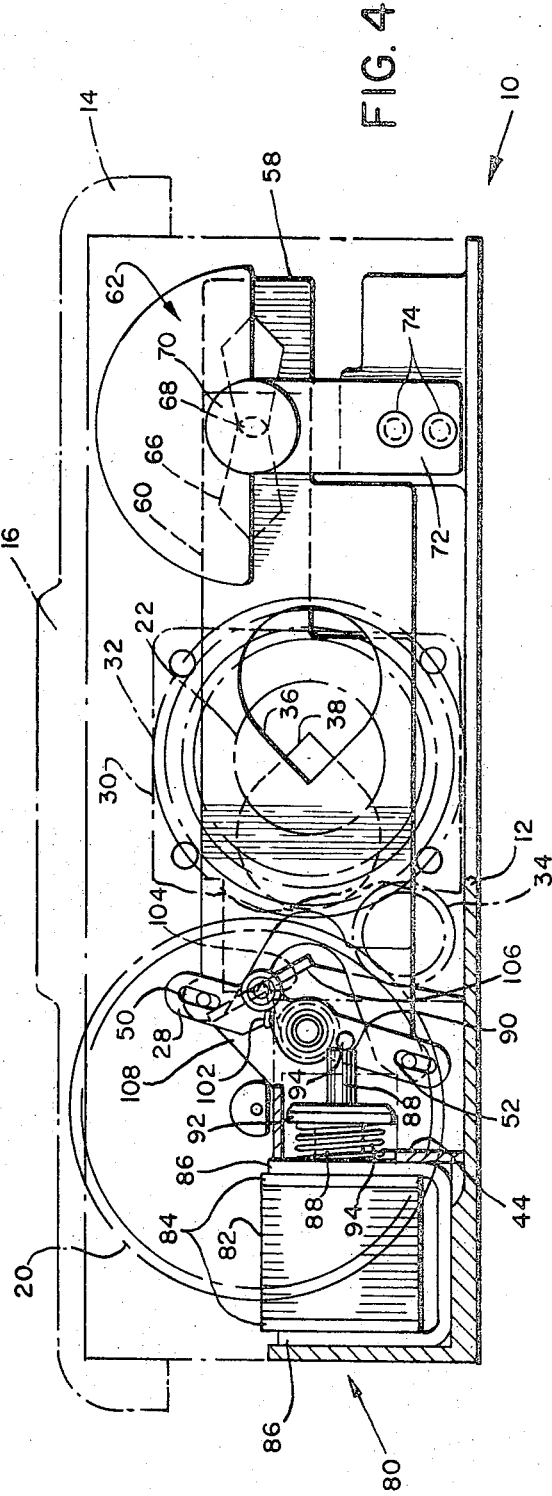

ELECTROMAGNETICALLY ACTUATED EXPOSURE CONTROL MECHANISM

BACKGROUND OF THE INVENTION

An exposure control system embodying a mechanism providing two parameter exposure control within an involved reflex photographic cycle is described in a U.S. Pat. by V. K. Eloranta, entitled "Exposure Control System," No. 3,641,889. Uniquely designed to be packaged within the very limited confines of the exposure control housing of a thin, compact camera, the exposure control system is characterized in the use of a tractive electromagnetic device, such as a solenoid, which is energized for the purpose of closing exposure mechanism blades. In a preferred embodiment of the system, two such exposure mechanism blades are provided which operate simultaneously and in synchronism through connection with a reciprocating "walking beam" type drive assembly. The latter assembly, in turn, is actuated by the noted solenoid in cooperation with a spring drive.

A technique for improving the dynamic performance of the above noted solenoid actuated exposure control system is described and claimed in a copending application for U.S. Pat. by C. C. Petersen, entitled "Dynamically Compensated Exposure Control System," Ser. No. 245,800, filed of even date herewith an assigned in common herewith. With this compensation technique, the dynamic performance or motion imparted in consequence of energization of the drive solenoid is isolated from exposure mechanism blade movement. For instance, both opening and closing movement of the blades of the exposure mechanism are provided by springs evidencing consistently repeatable force values or rate characteristics. Through an arrangement by which the solenoid is driven only against substantially mass isolated force values exhibited by one of the springs, the exposure control system is capable of operating with requisite statistical consistency even though energy input variations are encountered at its power supply.

The above noted dynamic corrections necessarily add to the complexity of the mechanism of the subject exposure control systems, and, as a consequence, add to their cost and bulk. To incorporate a desirably compensated system within the very limited confines of an exposure control housing of a thin, compact camera, a mechanism which carries out all of the necessary functions of the system while remaining both simple and highly compact is needed. For instance, such a mechanism should not require any addition to the size of the exposure control housing within which it is situated.

Of particular importance, where such compensated exposure mechanisms are required to be incorporated within popularly priced cameras, fabrication thereof must be available under high volume production procedures. For instance, the mechanisms must utilize a very minimal number of parts. Further, the exposure mechanism assemblies comprising these parts must be fabricable using automatic assembly machines and the like. Preferably, the parts must be directly insertable within a camera housing, no multidirectional manipulation thereof being acceptable under preferred manufacturing conditions.

SUMMARY OF THE INVENTION

The instant invention provides an exposure control mechanism of a variety actuated by selective energization of a solenoid and which is characterized in requiring a small number of easily assembled components to remain dynamically compensated. Dynamic compensation of the mechanism is provided in a manner permitting its use within the very limited confines of the exposure control housing within a thin, compact photographic camera of a size suited for carrying in the pocket of a garment.

Desirable simplicity as well as compactness of the exposure mechanism is availed through an assembly wherein the tractive electromagnetic device or solenoid thereof incorporates a plunger which is spring biased away from its positions of enhanced flux linkage. One end of the plunger of the solenoid is configured to provide a striker surface which, under the noted spring bias, is movable into abuttable contact with a light valve or shutter type exposure mechanism. The light valve arrangement is biased for movement to block an exposure aperture, however, when the noted abuttable contact is made, and the drive solenoid is de-energized, the light valve is driven toward orientations unblocking the exposure aperture. With the above-described arrangement, the influence of opening drive upon the light valve is negated while the valve is being driven to an aperture blocking orientation. As a consequence, desirably consistent dynamic closing performance is provided by the mechanism.

In a preferred arrangement, the bias exerted upon the solenoid plunger is provided by a compression spring constrained between an outer portion of the plunger and a mounting assembly of the solenoid. Further, such compression springs advantageously may be selected having a relatively high spring index, for instance over about 20, to lessen the power demands imposed upon a solenoid used within the exposure mechanism.

Another feature and object of the invention is to provide an exposure control mechanism of a variety including shutter-aperture blades movable between terminal positions in consequence of their connection with a reciprocally movable actuator or drive assembly resembling a walking beam. This drive assembly is movable in consequence of the actuation of a solenoid or the like. The solenoid is formed having an excitation winding as well as a plunger and housing arrangement, the plunger being arranged to be retracted within the excitation winding upon energization of the solenoid. An opening spring is arranged for cooperation with the plunger in a manner urging the outwardly disposed tip thereof into contact or abutment with the actuator or walking beam arrangement. The actuator or walking beam, itself, is biased for movement in a manner wherein the blades of the mechanism are urged to move in synchronism to block an exposure aperture. Preferably, this bias is provided by a closing spring having a relatively flat rate loading characteristic. The noted exposure aperture is unblocked by the procedure of de-energizing the excitation winding of the solenoid. With such de-energization, the opening spring urges the tip of the solenoid plunger into contact with the actuator to drive the blades toward open aperture positions against the mass-accellerative characteristics of the blade as well as the bias exerted by the closing spring.

To terminate an exposure, the excitation winding of the solenoid is energized to retract the noted plunger against the bias of the opening spring. Movement of the actuator by the closing spring, however, is isolated from opening spring and solenoid activity inasmuch as the earlier abutting contact is negated. Through this arrangement, consistant and repeatable opening and closing dynamic characteristics advantageously are realized with the mechanism.

Another feature and object of the invention is to provide a mechanism as above-described which is formed of significantly few and simple component parts such that the entire mechanism may be fabricated using high volume automatic assembly techniques. In a preferred arrangement, the noted opening spring is provided as a compression spring constrained between a mounting arrangement for the solenoid and an outer portion of the plunger. Representing a subassembly, the solenoid and opening spring are simply directly insertable within the housing of the exposure control mechanism. Additionally, the actuator or walking beam assembly may be of relatively simple design suited for facile attachment within the noted exposure control housing.

Another feature and object of the invention is to provide a mechanism as above described wherein the opening spring is configured as a compression spring and constrained between a solenoid mounting arrangement and its reciprocally movable plunger, such spring being selected as a compression spring having a relatively high spring index. Such a high index, for instance above about twenty, permits a relatively flat rate characteristic serving to economize upon the power characteristics required of the solenoid structure. Further, the noted closing spring preferably is selected having a relatively flat rate characteristic in the interest of solenoid power economy. These relatively flat rate spring characteristics cooperate to permit lower solenoid power levels, a feature of particular importance where thin, compact camera designs are involved.

As another feature and object of the invention, means may be incorporated for adjusting the preloading characteristics of the noted closing spring to provide for calibration of the entire mechanism against a predetermined dynamic standard. The latter calibration enhances the availability of the mechanism to camera designs suited to be manufactured for sale at popular prices.

Other objects of the invention will in part be obvious and will, in part, appear hereinafter.

The invention accordingly, comprises the mechanism and apparatus possessing the construction, combination of elements and arrangement of parts which is exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIG. 1 is a front elevational view of an exposure control housing incorporating the exposure control mechanism of the instant invention and showing an orientation of components providing for the full unblocking of an exposure aperture;

FIG. 2 is a top partial view of the exposure mechanism of FIG. 1;

FIG. 3 is a front elevational view of the exposure control housing of FIG. 1 showing the exposure mechanism components thereof as they are oriented to provide for the complete blocking of an exposure aperture;

FIG. 4 is a front elevational view of the exposure control housing of FIG. 1 showing an orientation of exposure mechanism components as they define an aperture opening of intermediate exposure value; and FIG. 5 is a graph incorporating representative spring rate curves for the mechanism of the invention.

DETAILED DESCRIPTION

The mechanism of the instant invention is particularly suited for use within the exposure control housing of a very thin and compact camera suited for carrying in the pocket of a garment. Such a camera has been described in U.S. Pat. No. 3,714,879. The noted exposure control housing must be foldable into a nested orientation with the other components of the thin camera to achieve requisite compactness and, accordingly, the space available for all the components of a fully automated exposure system is extremely limited. Such components include focusing gears, trim adjustment mechanisms, follow-focus actuating and trim systems, lens mountings and the like. A more detailed illustration of such components as they are fashioned for use within the exposure control housing is provided in a copending application for U.S. Pat. by L. G. Douglas, Ser. No. 168,671, entitled "Apparatus and System for Flash Photography" filed Aug. 3, 1971 and assigned in common herewith. In the interest of facilitating the description of the mechanism of the instant invention, certain of these above-cataloged components are deleted from the drawings and description to follow.

Referring to FIGS. 1 and 2, the noted thin and compact exposure control housing is illustrated generally at 10. The principal supporting structure for housing 10 is present as a rear casting 12 which is selectively machined to support the components of the mechanism. Surrounding the front and top of casting 12 is a front cover 14 which is structured at 16 to support a packaged flash lamp array and related components and which includes openings (not shown) through which protrude manually adjustable trim and focus wheels, the boundries of which are shown respectively at 18 and 20.

Centrally disposed within the back wall of casting 12 is an annular exposure opening 22, the periphery of which substantially defines the largest available aperture width for the mechanism. The light valve assembly within housing 10 is present as a dual bladed exposure control arrangement including blades 24 and 26 as well as an interconnecting actuator 28, the operation of which resembles that of a "walking beam." Blades 24 and 26 are slidably mounted within a bracket 30 fixed, in turn, to rear casting 12. Bracket 30 additionally serves as a support for an externally threaded lens housing or bezel, the periphery of which is illustrated by circular outline 32. Connection between bezel 32 and focus wheel 20 is provided by an idler gear shown in phantom at 34.

Blades 24 and 26, respectively, are configured having teardrop-shaped openings 36 and 38 formed therewithin. Openings 36 and 38 are positioned within respective blades 24 and 26 in a reversed sense such that, as they symmetrically overlap, they combine to form a symmetrically configured aperture opening across exposure opening 22.

The symmetry of the aperture openings defined by blades 24 and 26 is realized as a consequence of their connection with reciprocally movable actuator or walking beam 28. Walking beam 28 is seen to be journalled at about its midpoint for rotation about a stud 40, fixed to and extending inwardly from the forward face 42 (FIG. 2) of a U-shaped bracket 44. Spacing of beam 28 from face 42 is provided by an integrally formed collar 76 and associated washer 78. Elongate slots as at 50 and 52 are formed in the outward portions of walking beam 28 for the purpose of providing connection with pins 54 and 56 fixed to and extending, respectively, from blades 24 and 26. Thus interconnected, the blades 24 and 26 may move simultaneously and in correspondence with each other to define symmetrically configured aperture openings of progressively varying values over exposure opening 22. Elongate slots 50 and 52 serve the function of accommodating for the horizontally restricted movement of the blades 24 and 26 along cords extending through the locus of rotation of the tip of beam 28.

Blades 24 and 26 also are configured having elongate portions, respectively shown at 58 and 60, which extend through a light detecting station, shown generally at 62. Elongate portions 58 and 60, respectively, are formed incorporating secondary openings 64 and 66 which are configured in light regulating correspondence with the configurations of respective openings 36 and 38. Secondary openings 64 and 66 are oriented upon respective elongate portions 58 and 60 in a manner wherein they overlap in a symmetrical and mutually reversed sense to define a secondary aperture opening 68 within light detecting station 62. Opening 68, in turn, is located intermediate the photosensing elements of an exposure control circuit and an entrance optical assembly including a lens, outlined at 70, and a supporting bracket therefor, shown at 72. Bracket 72 is connected by rivets as at 74 to rear casting 12.

The instantaneous aperture openings defined at 68 are derived in synchronism with those present at exposure opening 22. Accordingly, the selective attenuation of scene light entering detecting station 62 serves to modulate a resultant signal to provide an instantaneous aperture value input to the exposure control circuit of the system. Such input permits the system to provide a two parameter exposure control.

To operate in conjunction with the program of a reflex photographic cycle, blades 24 and 26 must be actuated in a manner whereby openings 36 and 38 define an aperture of maximum available width prior to the commencement of such cycle. This normally open shutter condition, as shown in FIG. 1, facilitates viewing and focusing procedures. When operated to define an interval of exposure, exposure mechanism blades 24 and 26 are driven into an orientation wherein they fully block exposure opening 22. This closed orientation is shown in FIG. 3. An exposure interval is defined by moving the blades in synchronism to gradually open and define progressively varying aperture values until a predetermined exposure value is reached. When this value is reached, for instance, as illustrated in FIG. 4, a tractive electromagnetic device in the form of a solenoid such as that depicted generally at 80 is energized to terminate the exposure interval by actuating the light valve arrangement including blades 24 and 26 to cause their return to the closed orientation illustrated in FIG. 3.

Consistent dynamic performance of the mechanism in driving blades 24 and 26 between open orientations and a closed terminal position is realized through an arrangement wherein solenoid 80 is coupled to be operated substantially only against the force of a spring bias, while movement of blades 24 and 26 with their attendant mass-accelerative as well as frictional characteristics is supplied only from springs.

Solenoid 80 is formed having an excitation winding 82 which is wound about a cylindrically-shaped hollow bobbin, the flange portions of which are shown at 84. Bobbin 84, in turn, is connected to a U-shaped frame or support fixed to the bottom portion of rear casting 12.

Internally disposed within excitation winding 82 and bobbin 84 is a cylindrically-shaped plunger or movable armature 88. Plunger 88 is configured to slidably retract within bobbin 86 and winding 84 upon energization of the latter and is formed having an externally disposed tip including a striker surface 90 and an annular flange portion 92. Plunger 88 is biased to move from its retracted position by a compression spring 94 mounted coaxially thereabout and constrained between frame or support 86 and flange portion 92. An examination of compression spring 94 reveals that it is formed of a multitude of coils of a wire having a diameter of relatively small value when compared with the mean diameter of the cylindrically-shaped spring itself. This spring structure is one deriving a relatively high spring index representing the ratio of spring coil diameter to the diameter of the wire forming those coils. In the present embodiment, it is preferred that compression spring 94 be selected having a spring index of value higher than about 20.

Spring 94 serves to urge plunger 88 away from its retracted position within excitation winding 82 in a manner urging its striker surface 90 into abuttable contact with the striking surface of a pin 96 which is fixed to and extending from the lower leg of walking beam 28. Thus configured, when solenoid 80 is de-energized, compression spring 94 serves to urge walking beam 28 to rotate about stud 40 in a manner defining an open shutter condition. Movement of the plunger and spring assembly along the stroke path indicated is permitted by virtue of an opening (not shown) formed within the forward face 42 of bracket 44.

Stud 40, extending from forward face 42 of bracket 44, also serves to support a closing spring 100 (FIG. 2). Formed in a multiple turn, helical or spirally wound fashion, spring 100 is slidably mounted about stud 42 rearwardly of walking beam 28 and is oriented having its moving end 102 configured to be hooked about a small detent in the upper arm of walking beam 28. The stationary end 104 of spring 100 is inserted within a selected detent of a comb-shaped calibrating flange 106. Flange 106 is formed as an upwardly extending rearward side of bracket 44. Bracket 44 is connected by a fastener (not shown) to frame or support 86 of solenoid 80. Spring 100 is retained upon stud 40 by a connector assembly including a washer 110 and E-ring 112, (FIG. 2).

When mounted, spring 100 is preloaded to a predetermined force value. This loading value is selected to be of a lesser amount than the force values exhibited by compression spring 94. Accordingly, unless solenoid 82 is energized to retract plunger 88, the force exerted by closing spring 100 upon walking beam 28, urging blades 24 and 26 into the closed orientation shown in FIG. 3, is overcome and the blades define an open aperture condition as shown in FIGS. 1 and 4. When solenoid 82 is energized, however, plunger 88 compresses spring 94 at a rate selected to negate the abutting contact of striker surface 90 with pin 96. Accordingly, walking beam 28 and attached blades 24 and 26 are driven solely by the bias of spring 100 toward the closed terminal position shown in FIG. 3. This closing motion is ideally consistent and free of any dynamic influence arising from opening spring 94 or plunger 88. Such an arrangement advantageously permits consistent performance even though the power supply input of solenoid 80 may vary somewhat. The entire drive arrangement may be calibrated by adjusting the preloading of closing spring 100 at comb-shaped calibrating flange 106. Typically, a predetermined dynamic standard is established and the exposure mechanism is calibrated at 106, accordingly.

Referring additionally to FIG. 5, the characteristics of springs 94 and 100 are revealed in more detail. To achieve requisite performance of the exposure mechanism, it is necessary that opening spring 94 be selected having a higher loading characteristic or exhibit higher force values than closing spring 100. As shown in the chart relating relative position of blades 24 and 26 with spring loads, opening spring 94 operates from a preloaded force value of about 60 grams, when blades 24 and 26 are open, to a fully loaded force value of about 70 grams, when blades 24 and 26 are fully closed. Note additionally, that the loading characteristic of spring 94, in view of its relatively high spring index, is both constant and of a relatively flat rate. The constant characteristic permits more consistent design from mechanism to mechanism while the power conserving flat rate characteristic is achieved through selection of a spring index of above about the value 20.

Closing spring 100, being wound by opening spring 94 during opening motion of blades 24 and 26, evidences a loaded force value of about 40 grams and an unlaoded value of about 25 grams. Spring 100 further evidences a relatively flat rate characteristic derived from its multiple turn design.

With the spring arrangement shown, blades 24 and 26 of exposure mechanism 10 are driven from a closed orientation towards open positions by the repeatable or consistent force values of opening spring 94. In driving walking beam 28 to achieve this opening, spring 94 is called upon to work against the mass-acceleration characteristics of blades 24 and 26, their frictional retardation characteristics as well as the loading force values exhibited at closing spring 100. When excitation winding 82 of solenoid 80 is energized to terminate an exposure, plunger 88 is withdrawn or retracted at a rate sufficient to negate the abutting contact between striker surface 90 and the striking surface of pin 96, thereby permitting spring 100 to rotate walking beam 28 in a closing direction. Accordingly, walking beam 28 is driven only from closing spring 100. Inasmuch as spring 100 evidences consistent and repeatable force values, the closing motion of blades 24 and 26 is ideally consistent.

The relatively flat rate selected for springs 94 and 100 advantageously reduces the amount of power required of solenoid 80. As evidenced in FIG. 5, a loading value increment (for instance, that in evidence between the 40 and 60 gram levels of the graph) is needed in order to permit the loading of spring 100 by spring 94. Through the use of a relatively flat rate and high spring index arrangement, the ultimate load imposed upon solenoid 80 is, disregarding safety factors, about 70 grams. Should conventional rate springs be utilized in lieu of the flat rate springs shown at 94 and 100, spring rate curves as at 120 and 122 must be considered in the design of the mechanism.

Note that a closing spring of constant higher rate as shown at curve 120 would result in a full loading requirement of over 60 grams. A requisite opening spring rate as shown at curve 122 would commence well above the 60 gram position and require a solenoid design having a power output characteristic of much higher levels than those required of the instant mechanism. Where power supplies for the solenoid as at 80 are limited, such loading or power requirements are usually found to be unacceptable.

The structure of the mechanism of the instant invention is particularly advantageous where high volume production techniques are contemplated. Note, for instance, that solenoid 80, compression spring 94 and walking beam 28 along with supporting bracket 44 can be prefabricated as a modular unit. This unit may then be directly inserted by automatic means into rear casting 12. Further, the simplified structure embodied within the biased plunger arrangement, is simply fabricated for developing the initial module. Note additionally, that the entire assembly represents a highly compact design, a feature of considerable importance for the thin compact housing illustrated.

Since certain changes may be made in the above-described photographic apparatus without departing from the scope of the invention herein involved, it is intended that all matter contained in the above description or shown in the accompanying drawings shall be interpreted as illustrative and not in a limiting sense.

What is claimed is:

1. An exposure control mechanism for photographic apparatus comprising:

exposure mechanism means movable toward and away from one position to control the light permitted to pass through an exposure aperture;

tractive electromagnetic means including an excitation winding and a movable armature, said armature being movable in a first direction upon energization of said excitation winding;

first spring means biasing said exposure mechanism means toward said one position; and second spring means biasing said movable armature in a second direction and effective when said excitation winding is unenergized to cause said armature to engage in abuttable contact with and urge said exposure mechanism to move away from said one position against the bias of said first spring means, said armature being moved away from said abuttable contact upon energization of said winding so as to permit movement of said exposure mechanism means exclusively under the influence of said first spring means.

2. The exposure control mechanism of claim 1 in which:

said tractive electromagnetic means includes means supporting said excitation winding and said armature in an orientation selected to provide said abuttable contact;

said second spring means is present as a compression spring constrained between said supporting means and said armature; and said first spring means is configured having a loading characteristic evidencing low rate values and instantaneous force values less than corresponding force values exhibited by said second spring means.

3. The exposure control mechanism of claim 2 wherein said exposure mechanism means is operative to fully block the said passage of light through said aperture when at the said one position and is further operative to establish a variation of aperture values over said exposure aperture when moved away from said one position.

4. An exposure control mechanism for photographic apparatus comprising:
 shutter means movable between first and second positions to control the light permitted to pass through an exposure aperture;
 tractive electromagnetic means including an excitation winding and a movable armature, said armature being movable in one direction upon excitation of said excitation winding;
 first spring means biasing said shutter means toward said first position and into abutment with said movable armature; and
 second spring means biasing said movable armature in a second direction and effective when said excitation winding is unenergized to force said shutter means into said second position against the bias provided by said first spring means, the energization of said winding being effective to displace said armature temporarily out of abutment with said shutter means thereby permitting said first spring means to move said shutter means to said first position.

5. The exposure control mechanism of claim 4 in which:
 said tractive electromagnetic means includes means supporting said excitation winding and said armature in an orientation selected to provide said abuttable contact; and
 said second spring means is constrained between said supporting means and said armature.

6. The exposure control mechanism of claim 4 in which said second spring means is present as a compression spring.

7. The exposure control mechanism of claim 4 in which:
 said tractive electromagnetic means includes means supporting said excitation winding and said armature in orientations selected to provide said abutment; and
 said second spring means is present as a compression spring constrained between said supporting means and said armature.

8. An exposure control mechanism for photographic apparatus comprising:
 valve means selectively movable to block and unblock an exposure aperture;
 tractive electromagnetic means including an excitation winding, and armature means, said armature means being movable in one direction upon energization of said excitation winding, said tractive electromagnetic means further including means supporting said excitation winding and said armature means in an orientation selected to provide abuttable contact between said armature means and said valve means;

a compression spring constrained between said supporting means and said armature means for urging said armature means to move in one direction establishing said contact upon de-energization of said excitation winding;
 a second spring having a loading characteristic evidencing low rate values and instantaneous force values less than corresponding force values exhibited by said compressing spring and biasing said valve means for movement to block said exposure aperture; and
 means for adjusting said second spring in a manner pre-loading said compression spring so as to calibrate the said movement of said valve means to a predetermined standard.

9. The exposure control mechanism of claim 1 in which:
 said tractive electromagnetic means includes means supporting said excitation winding and said armature in an orientation selected to provide said abuttable contact; and
 said second spring means is constrained between said supporting means and said armature.

10. The exposure control mechanism of claim 1 in which said second spring means is present as a compression spring.

11. The exposure control mechanism of claim 1 in which said second spring means is present as a compression spring having a spring index of value higher than about 20.

12. The exposure control mechanism of claim 1 in which:
 said tractive electromagnetic means includes means supporting said excitation winding and said armature in orientations selected to provide said abuttable contact; and
 said second spring means is present as a compression spring constrained between said supporting means and said armature.

13. The exposure control mechanism of claim 12 in which said compression spring is selected having a spring index higher than about 20.

14. The exposure control mechanism of claim 2 in which said second spring means is present as a compression spring having a spring index of value higher than about 20.

15. The exposure control mechanism of Claim 1 wherein said first spring means includes means for adjustably preloading said second spring means so as to calibrate the said movement of said exposure mechanism means to a predetermined standard.

16. The exposure control mechanism of claim 2 wherein said tractive electromagnetic means is present as a solenoid, said armature thereof being present as a plunger retractable within said excitation winding upon energization thereof and having means defining a striker surface at one end for providing said abuttable contact; and
 said compression spring is constrained between said supporting means and said means defining a striker surface, so as to spring bias said plunger for movement outwardly from said excitation winding.

17. The exposure control mechanism of claim 16 in which said exposure mechanism means includes a reciprocally movable striking surface positioned for abuttable contact with said striker surface.

18. An exposure control mechanism comprising:

blade means movable in synchronism to block and unblock an exposure aperture;

acutator means reciprocally drivable to move said blade means about said exposure aperture;

solenoid means having an excitation winding and plunger means said plunger means being configured having a striker surface abuttably contactable with said actuator means;

closing spring means cooperating with said actuator means for selectively moving said blade means toward a position effecting the blocking of said exposure aperture;

opening spring means cooperating with said plunger means for urging said striker surface into said contact with said actuator means to effect aperture unblocking movement of said blade means.

19. The exposure control mechanism of claim 18 in which:

said solenoid means includes means supporting said excitation winding and said plunger means in an orientation selected to provide said abuttable contact; and said opening spring means is constrained between said supporting means and said plunger means.

20. The exposure control mechanism of claim 19 in which:

said opening spring means is present as a compression spring.

21. The exposure control mechanism of claim 19 in which:

said opening spring means is present on a compression spring having a spring index value higher than about 20.

22. The exposure control mechanism of claim 19 in which:

said opening spring is present as a compression spring; and said actuator means is configured having a striking surface drivably contactable by said striker surface to move said blade means to progressively unblock said aperture when said excitation winding is deenergized.

23. The exposure control mechanism of claim 22 in which:

said closing spring means is configured having a loading characteristic evidencing a low rate and instantaneous force values less than corresponding force values exhibited by said compression spring.

24. The exposure control mechanism of claim 23 in which:

said solenoid means is configured for retracting said plunger means within said excitation winding upon energization thereof, said retraction being selected to load said compressin spring at a rate negating abutting contact between said striker surface and said striking surface so as to permit said closing spring to drive said actuator means to move said blocking position.

25. The exposure control mechanism of claim 24 in which:

said compression spring is configured having a spring index value higher than about 20.

26. The exposure control mechanism of claim 24 wherein said closing spring means includes adjustable preloading means for calibrating the said movement of said blade means to a predetermined dynamic standard.

* * * * *